US006189487B1

United States Patent
Owen et al.

(10) Patent No.: US 6,189,487 B1
(45) Date of Patent: *Feb. 20, 2001

(54) HEATED ANIMAL BED

(75) Inventors: Donald B. Owen, Batavia; Thomas K. Reusche, Elburn, both of IL (US)

(73) Assignee: Allied Precision Industries Inc., Elburn, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/289,228

(22) Filed: Apr. 9, 1999

(51) Int. Cl.[7] .................................................. H01K 29/00
(52) U.S. Cl. ........................ 119/28.5; 219/217; 219/219
(58) Field of Search ........................... 119/28.5; 219/211, 219/212, 213, 217, 528, 219, 529, 549

(56) References Cited

U.S. PATENT DOCUMENTS

| | | | |
|---|---|---|---|
| 2,195,958 | 4/1940 | Kearsley | 219/20 |
| 2,617,005 | * 11/1952 | Jorgensen | 219/217 |
| 2,842,651 | * 7/1958 | Neely | 219/217 |
| 2,961,524 | 11/1960 | Newman | 219/19 |
| 2,980,058 | * 4/1961 | Hoffman | 119/28.5 |
| 3,041,441 | * 6/1962 | Elbert et al. | 119/28.5 |
| 3,125,663 | 3/1964 | Hoffman | 219/46 |
| 3,380,087 | 4/1968 | Petty et al. | 5/343 |
| 3,427,431 | 2/1969 | Costanzo | 219/212 |
| 3,648,469 | 3/1972 | Chapman | 62/3 |
| 4,031,352 | 6/1977 | Oosterberg | 219/212 |
| 4,257,349 | 3/1981 | Carlin | 119/1 |
| 4,332,214 | 6/1982 | Cunningham | 119/1 |
| 4,591,694 | * 5/1986 | Phillips | 219/217 |
| 5,261,352 | 11/1993 | Stammelman | 119/28.5 |
| 5,371,340 | 12/1994 | Stanfield | 219/217 |
| 5,685,257 | * 11/1997 | Feibus | 119/28.5 |
| 6,073,998 | 6/2000 | Siarkowski et al. | 297/180.12 |

* cited by examiner

Primary Examiner—Peter M. Poon
Assistant Examiner—Judith A. Nelson
(74) Attorney, Agent, or Firm—McAndrews, Held & Malloy, Ltd.

(57) ABSTRACT

A heated bed for dogs, cats or other animals which can provide a selected amount of heat to the animal depending upon environmental temperatures. The bed includes a hollow blanket casing within which is disposed at least three layers of foam insulation material placed one on top of another. A removable heating element is interposed between two adjacent layers of the foam material and supplies heat to the animal resting on the bed. The amount of heat delivered to the animal is regulated by selectively positioning the heating element between different adjacent layers of the foam material. The heating element is connected to a power source via a step down transformer which converts high voltage energy into lower voltage energy to minimize the danger of serious shock to the animal.

11 Claims, 2 Drawing Sheets

HEATED ANIMAL BED

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present invention relates to a heated bed for dogs, cats or other animals or pets, and more particularly to a heated bed that employs a heating element that may be selectively positioned within the bed to regulate the amount of heat delivered to an animal resting on the bed.

Heated beds or pads for pets, livestock or other animals have been known and used for many years. One difficulty with prior art heated pet beds is that it is sometimes difficult to adjust and regulate the temperature of the bed in order to obtain the desired amount of heat, especially for pet beds that do not include a thermostat. While the use of a thermostat in prior art pet beds does facilitate the regulation of the temperature of the bed, a thermostat also makes construction of prior art beds more complicated.

One object of the present invention is to provide a heated pet bed in which the amount of heat delivered to the upper surface of the bed can be easily regulated.

Another object of the present invention is to provide a heated pet bed which is of a rugged construction and which employs multiple layers of foam material to provide both padding and heat insulation within the bed.

Another object of the present invention is to provide a heated pet bed that has a simple construction and that can deliver a selected amount of heat without the need for thermostats, switches or other complicated structures.

A further object of the present invention is to provide a heated pet bed that employs a removable heating element that can be selectively positioned between selected foam layers to regulate the amount of heat delivered to an animal resting on the bed.

SUMMARY OF THE INVENTION

A heated pet bed for delivering a selected amount of heat to an animal resting on the bed is disclosed. The pet bed comprises an upper and a lower blanket layer that are joined together at their peripheral edges to form a hollow blanket casing. Disposed within the hollow blanket casing are at least three layers of foam insulation material. The foam layers are positioned one on top of another so that there is at least one bottom foam layer adjacent to a middle foam layer, and at least a middle foam layer adjacent to a top foam layer. A removable heating element is selectively interposed between two selected adjacent layers of the foam material to regulate the amount of heat delivered to the animal.

DESCRIPTION OF THE DRAWINGS

The manner in which the objectives and other desirable features of the invention can be obtained is explained in the following description and the accompanying drawings in which.

DESCRIPTION OF THE PREFERRED EMBODIMENT

Figure 1:
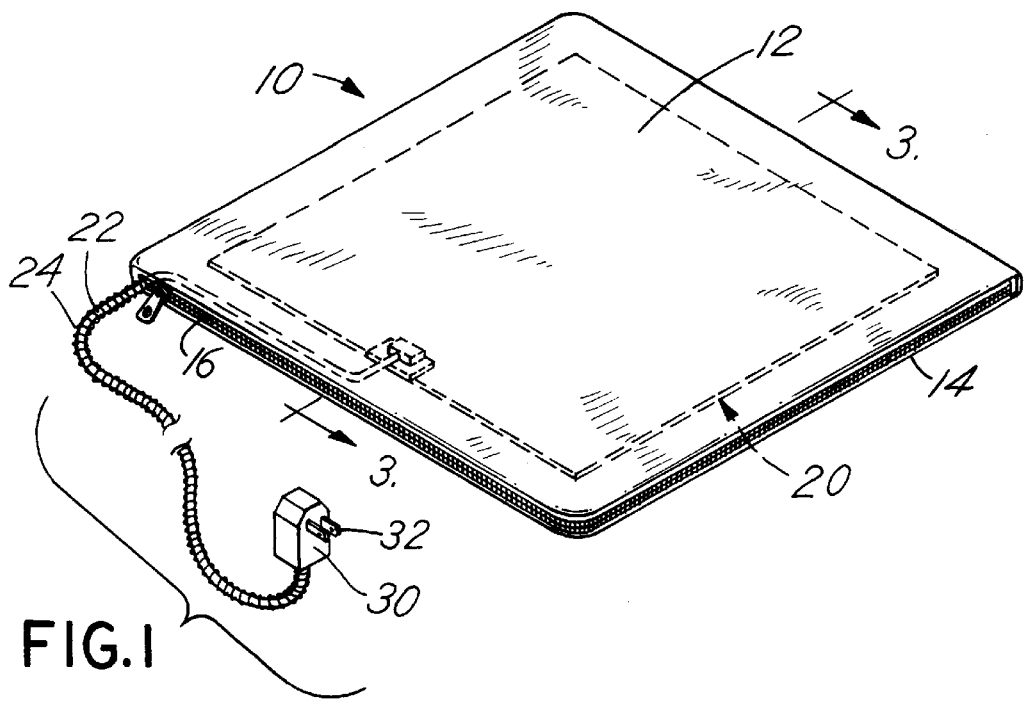
FIG. 1 is a perspective view of a preferred embodiment of the heated bed of the present invention.
Figure 2:
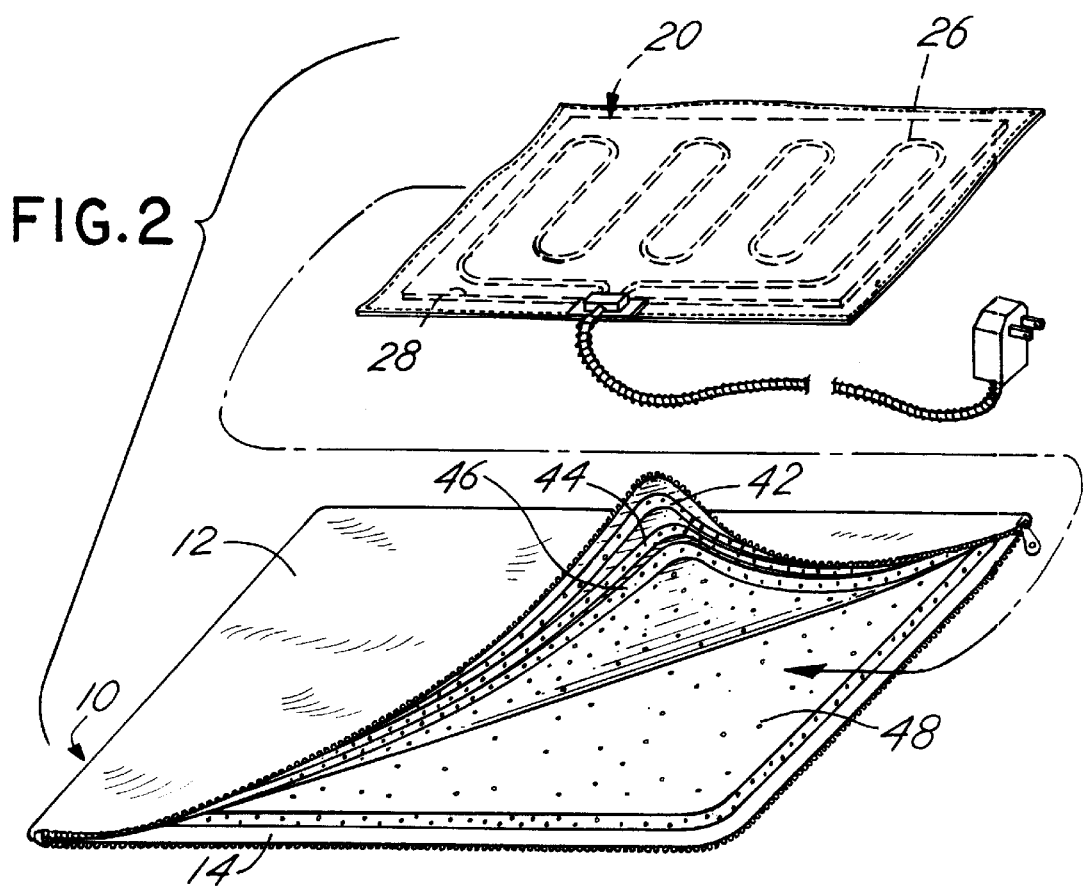
FIG. 2 is an exploded view showing placement of the heating element between the bottom two layers of foam insulation material.

Referring to FIGS. 1 and 2, a preferred embodiment of the heated pet bed is designated by the numeral 10. The pet bed comprises an upper blanket layer 12 and a lower blanket layer 14 which are joined along their peripheral edges by means of a zipper 16 to form a hollow blanket casing. A zipper is preferred for joining the upper and lower blanket layers together since a pet will be less likely to be able to pull the layers apart when fastened with a zipper. However, other means for joining the two layers together may be employed, such as snaps, laces, or loop and pile fasteners sold under the name VELCRO®. In an especially preferred embodiment, the upper and lower blanket layer are sewn together on two peripheral edges and are fastened together on the other two peripheral edges by a zipper. The upper and lower blanket layers are made of a flexible, durable, material, such as cotton canvas, nylon, or vinyl.

The pet bed includes an electric heating element 20 to which power is supplied through a power cord 22. The power cord extends from the heating element through an opening between the upper and lower blanket layers 12, 14 to a conventional step down transformer 30. Preferably, a coiled wire 24 is placed over the power cord to reinforce the cord and discourage chewing by a dog and especially by a young puppy.

The step down transformer 30 is provided with a standard prong connector 32 for insertion into an electrical outlet. The transformer receives relatively high voltage (120 volts) energy from the electrical outlet and converts it into lower voltage electrical energy (24 volts) which is supplied through the power cord 22 to the heating element 20. The lower voltage electrical energy minimizes the danger of serious electrical shock to the animal should the animal chew through the power cord.

The heating element may be an electric resistance wire 26 laid out in a generally serpentine fashion and imbedded within a backing sheet 28. The backing sheet is preferably a vinyl insulated pad, but could also be foil layers with the resistance wire sandwiched therebetween. Alternatively, the heating element may be another type of float heater pad known in the art or a printed ink resistive heater. The resistive value of the heating element employed should be low enough so that the bed can be operated continuously during cold weather without overheating.

Figure 3:
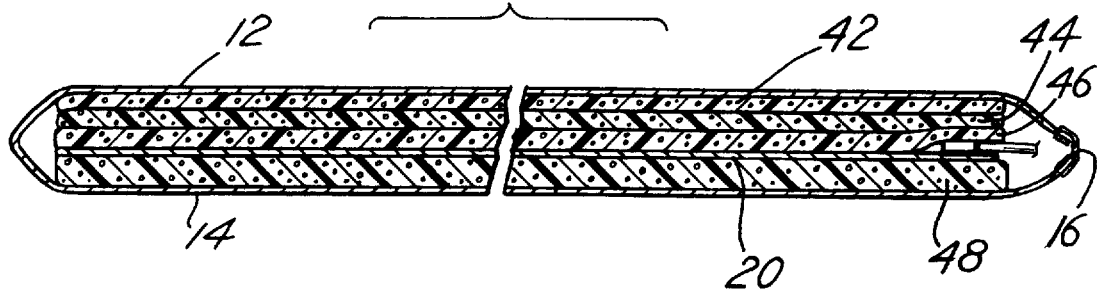
FIG. 3 is a cross-sectional view taken along lines 3—3 of FIG. 1.
Figure 4:
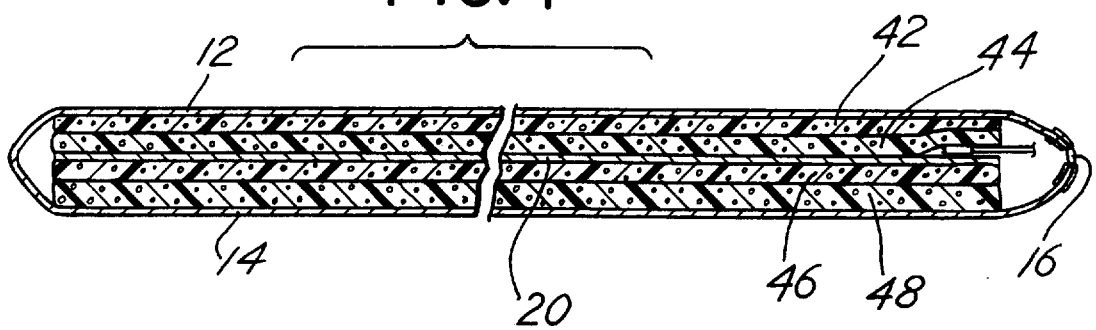
FIG. 4 is a cross-sectional view similar to FIG. 3, except illustrating the heating element between two middle layers of foam insulation material.
Figure 5:
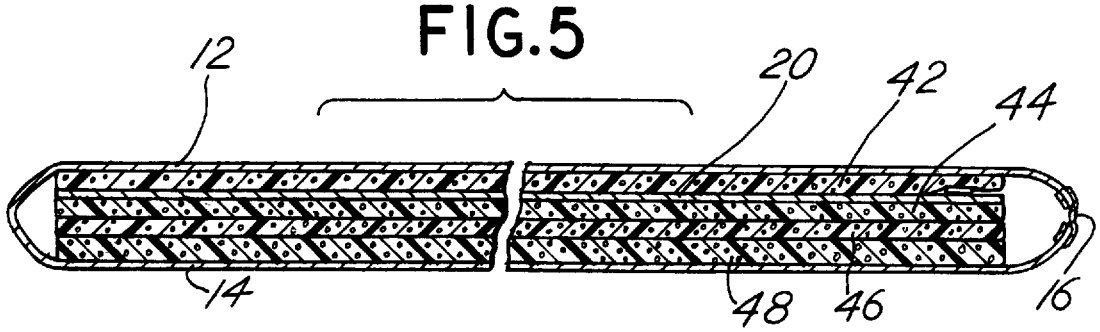
FIG. 5 is a cross-sectional view similar to FIG. 3, except illustrating the heating element between the two top layers of foam insulation material.

Within the blanket casing formed by the upper and lower blanket layers 12, 14 are disposed at least three layers of insulating foam material placed one on top of another. For example, as illustrated in FIGS. 3–5, four layers of insulating foam material 42, 44, 46, 48, are disposed within the blanket casing. The heating element 20 is interposed between two adjacent layers of the foam material so that at least one foam layer is above the heating element and at least one foam layer is below the heating element. The foam layers provide padding for the bed and provide thermal insulation for controlling the distribution of heat generated by the heating element. In order to minimize the amount of heat flowing downwardly to the bottom blanket layer 14 where it is not needed, the bottom foam layer 48 is preferably about twice as thick as the other foam layers. For example, the bottom foam layer can be a foam sheet that is ¾ inches thick, while the middle and top foam layers can be foam sheets that are ¼ inches thick. Having a thicker bottom foam layer makes the bed more economical to operate because much of the heat generated is supplied to the upper blanket layer 12 where it is needed.

One of the unique features of the present invention is that the amount of heat supplied to the upper blanket layer 12 can be easily regulated by selectively interposing the heating element 20 between different adjacent foam layers. If, for example, only a small amount of heat is desired to be transferred to the upper blanket layer, the heating element can be interposed between the bottom foam layer 48 and middle foam layer 46, as illustrated in FIG. 3. In this selected position, the heating element will transfer the least amount of heat to the upper blanket layer 12. If greater amounts of heat are desired due to, for example, use of the bed in a colder or an outdoor location, then the heating element can be interposed between middle foam layers 44 and 46, as illustrated in FIG. 4, to transfer an intermediate amount of heat to the upper blanket layer 12, or between middle foam layer 44 and top foam layer 42, as illustrated in FIG. 5, to transfer the greatest amount of heat to the upper blanket layer. Of course, the heating element can be removed altogether if there is no need to provide heat to the upper blanket layer, and the bed can be used as a simple cushion for the animal.

By selectively positioning the heating element between different levels of the foam material, the amount of heat transmitted to the upper blanket layer, and, consequently an animal resting on the bed, can be easily selected and regulated without the need for a thermostat or a circuit interrupting switch, thereby simplifying the design, manufacture and operation of the heated bed.

While the preferred embodiments of the invention have been illustrated and described, it will be understood that changes in the construction may be made within the scope of the appended claims without departing from the spirit of the invention.

What is claimed is:

1. A heated animal bed for providing a selected amount of heat to an animal comprising:
   a top blanket layer;
   a bottom blanket layer;
   means for joining the top blanket layer to the bottom blanket layer at the periphery thereof to form a hollow casing;
   at least three layers of insulating foam material positioned one on top of another within the hollow casing such that there is at least a bottom foam layer adjacent to a middle foam layer, and at least a middle foam layer adjacent to a top foam layer;
   a removable electric heating element for imparting heat to the top blanket layer when supplied with current from a power source, the heating element being sized and configured for insertion between the foam layers, such that the heating element may be selectively interposed between two adjacent layers of the insulating foam material to provide a selected amount of heat to the top blanket layer.

2. A heated animal bed as claimed in claim 1 wherein the bottom foam layer has a thickness greater than that of the middle and top foam layers.

3. A heated animal bed as claimed in claim 1 wherein at least four layers of insulating foam material are positioned within the hollow casing.

4. A heated animal bed as claimed in claim 1 wherein the electric heating element is in circuit with a step down transformer.

5. A heated animal bed as claimed in claim 1 wherein the electric heating element is an electric resistance wire.

6. A heated animal bed for providing a selected amount of heat to an animal comprising:
   a hollow blanket casing having an upper blanket layer and a lower blanket layer;
   at least three layers of insulating foam material positioned one on top of another within the hollow casing such that there is at least a bottom foam layer adjacent to a middle foam layer, and at least a middle foam layer adjacent to a top foam layer;
   a removable electric heating element for imparting heat to the upper blanket layer when supplied with current from a power source, the heating element being sized and configured for insertion between the foam layers, such that the amount of heat being imparted being determined by selectively interposing the electric heating element either between the top and middle foam layers or the middle and bottom foam layers.

7. A heated animal bed as claimed in claim 6 wherein the bottom foam layer is thicker than the middle and top foam layers.

8. A heated animal bed as claimed in claim 6 wherein the electric heating element is in circuit with a step down transformer.

9. A heated animal bed as claimed in claim 6 wherein the electric heating element is an electric resistance wire.

10. A heated animal bed for providing a selected amount of heat to an animal comprising:
    a hollow blanket casing having an upper blanket layer and a lower blanket layer;
    an electric heating element for imparting heat to the upper blanket layer when supplied with current from a power source; and
    top, middle and bottom layers of insulating material positioned one on top of another within the hollow casing and defining a first pocket between the top and middle layers of insulating material and a second pocket between the middle and bottom layers of insulating material, each of the pockets being sized to receive the heating element such that the amount of heat imparted is determined by selectively interposing the electric heating element either in the first pocket between the top and middle layers of insulating material or the second pocket between middle and bottom layers of insulating material.

11. A heated pet bed as claimed in claim 10, wherein the bottom layer of insulating material has a thickness greater than that of the middle and top layers of insulating material.

* * * * *